No. 746,181. Patented December 8, 1903.

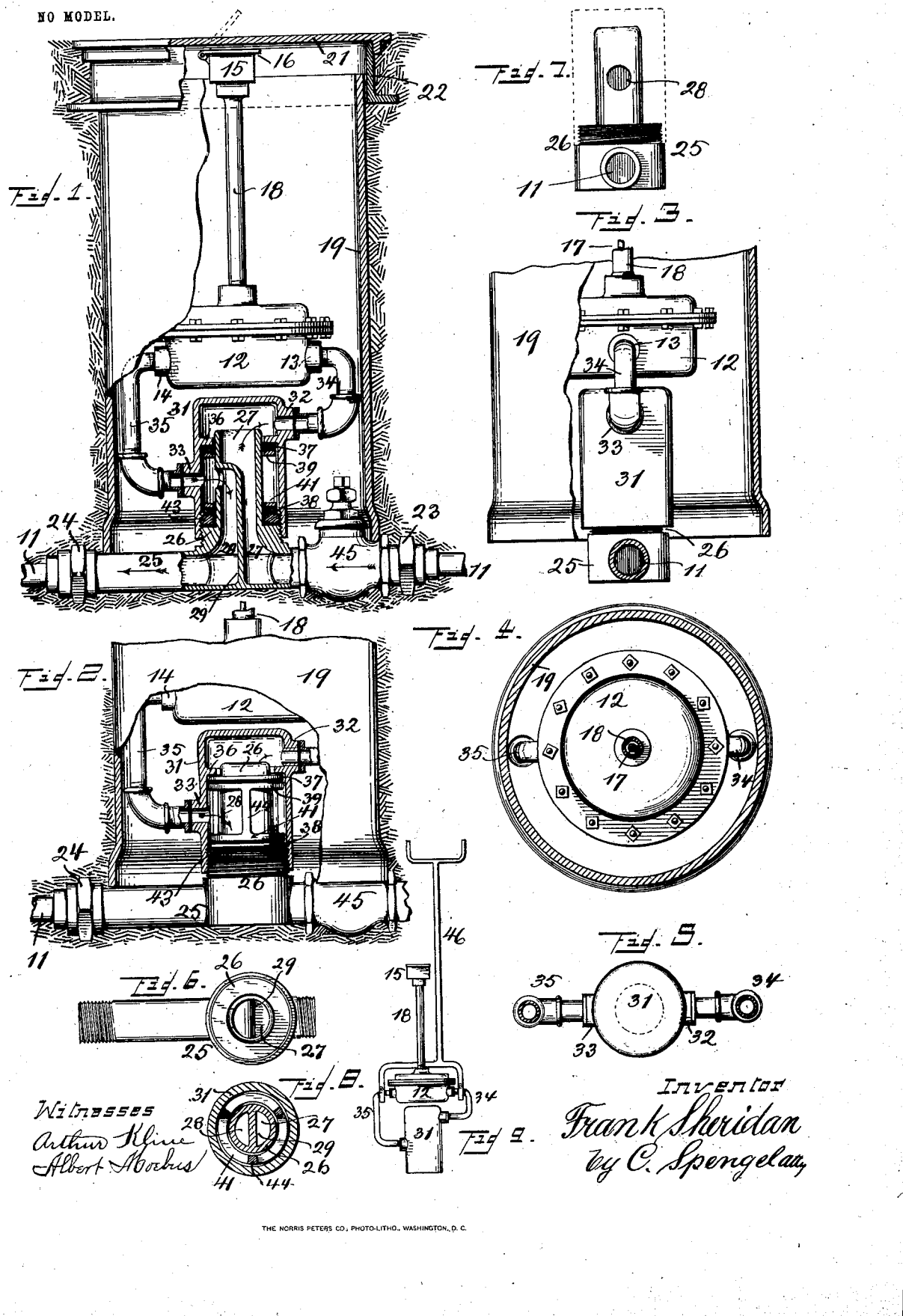

UNITED STATES PATENT OFFICE.

FRANK SHERIDAN, OF COVINGTON, KENTUCKY, ASSIGNOR OF ONE-HALF TO THOMAS SULLIVAN, OF COVINGTON, KENTUCKY.

METER-COUPLING.

SPECIFICATION forming part of Letters Patent No. 746,181, dated December 8, 1903.

Application filed June 5, 1903. Serial No. 160,160. (No model.)

*To all whom it may concern:*

Be it known that I, FRANK SHERIDAN, a citizen of the United States, residing in Covington, in the county of Kenton and State of Kentucky, have invented a certain new and useful Meter-Coupling; and I do declare the following to be a clear, full, and exact description thereof, attention being called to the accompanying drawings, with the reference characters marked thereon, which form also a part of this specification.

This invention relates to devices used in connection with the arrangement and formation of pipe-conduits conveying fluids, like water or gas, and where such fluid is measured as to quantity while supplied through such pipe-conduits to a place where it is used and consumed. For the purpose of this measurement devices called "meters" are used which are arranged so as to form a part of the pipe-conduit mentioned, so that the fluid during its passage passes also through the meter and is thus measured. These meters must be placed so that the recording and indicating part thereof may be readily inspected whenever the meter is to be read, and when used in connection with water and situated outside of a building they must also be placed sufficiently deep, so as to be beyond the effects of frost. Finally they should be connected in a manner to permit their ready detachment for purposes of repair, inspection, tests, &c., and reconnection thereafter without requiring disturbance of the pipe-line or digging, &c. To satisfy these requirements, I provide a device or coupling which is inserted so as to form a part of the pipe-conduit and to which the meter is connected, so as to also form a part of the pipe-conduit, and from which coupling it may be readily detached and thereafter quickly reconnected without requiring any disturbance of any other part.

The prominently new and leading feature of my improved coupling is a construction which permits it to be used with meters as they exist, requiring, therefore, no change in these meters nor any changes in the construction of their housings to adapt them to be used in connection with my coupling.

In the following specification and particularly pointed out in the claim is found a full description of the invention, together with its parts and construction, which latter is also illustrated in the accompanying drawings, in which—

Figure 1 is a sectional side elevation with portions broken away, showing all parts concerned in my invention. Fig. 2 shows the lower part of the preceding figure. Fig. 3 shows the same parts, the view being taken at right angles to the two preceding ones. Fig. 4 is a horizontal section of Fig. 1, taken above the meter and showing this latter in top view. Fig. 5 is a top view of one of the complementary parts of the coupling, it being the one which is attached to the meter. Fig. 6 is a top view of the other complementary part of the coupling, it being the one which forms a part of the pipe-conduit and receives the part first mentioned. Fig. 7 is an end elevation of this latter part. Fig. 8 is a horizontal section through the two parts of the coupling when they are engaged with each other for removably attaching the meter. Fig. 9, at reduced scale, shows manner of manipulation by means of a suitable implement for the purpose of detaching the meter from the pipe-conduit, the same being shown as so detached.

In the case described the devices shown are assumed as being used in connection with a water-supply service, the water passing through pipes 11 11, and the supply is measured by a meter 12 of customary construction, through which it passes on one side and out of the other, the connection for such purpose being made at nipples 13 and 14. The operations of the meter are shown by an indicating device contained in a box 15, the dial-faces of which are generally protected by a suitable cover 16, hingedly secured. When a meter is so arranged and situated as to be always readily accessible for reading—as, for instance, when used on the inside of a building—the indicating device in box 15 may be connected directly to the meter-housing, so that both form practically one connected device. When a meter is used on the outside, as here assumed and shown, the two are separated, the meter to be protected against frost is placed low in the ground and connected thereat to the service-pipes 11 11, while the indicating device is close up to the surface of the ground to permit convenient reading of the meter-dial from time to time. The operation of the meter is transmitted to the indicator by means of a rod or shaft 17, inclosed for protection in a tube 18, which connects the meter-housing and the indicator-box, to both of which it is attached.

The parts as described may be covered by ground with the exception of the top of the indicator-box, or they may be inclosed in a so-called "meter-box" 19, which protects all parts and is closed on top by a removable manhole-cover 21, which permits access for reading the meter. In the case illustrated this meter-box is assumed to consist of a vitrified pipe which may be a customary sewer-pipe. On top it is steadied by an iron flanged ring 22, which also receives the manhole-cover 21. No novelty is claimed for these parts as so shown and arranged.

Irrespective of the alternate arrangement of meter and indicator with reference to each other, as above referred to, the meter itself is under present practice connected directly to the pipe-line 11 11—that is, by means of union-coupling 23 connection would be made to nipple 13 and by means of a similar coupling 24 the insertion would be completed by connection to nipple 14.

If access to the meter becomes necessary for purposes of inspection, repairs, testing, renewal or exchange, &c., it is clear that such under the described conditions can only be gained by digging up the ground. Such is necessary even where a meter-box is used unless the latter is of a diameter sufficiently large to admit a person to descend into it.

The object and leading feature of my invention is to permit such access without digging or even descending into a meter-box, so that the meter may be detached and reconnected all from above the surface. This I accomplish by means of an independent intermediate coupling which consists of two complementary parts, one of which is attached so as to form a part of the pipe-line, while the other is attached so as to form a connected part of the meter, and both being so fitted that they may be attached to each other or separated by a screw connection requiring merely a rotary operation, which may be had from above, aided, if necessary, by a suitable implement. The first part mentioned (indicated at 25) is of suitable length, so as to be adapted to take its place in the pipe-line to which it is attached by couplings 23 and 24, previously mentioned. Midway its ends there is an enlargement of sufficient size for the purpose and in shape of a boss, forming on its outside a screw-threaded nipple 26 and containing on its inside two ports 27 and 28. These ports are carried upwardly by means of an extension of nipple 26, their outlets being at different points, as shown. It will be noted that by means of a partition 29 these ports are completely and effectually divided. The other complementary part of this coupling consists, substantially, of a hollow housing 31, open at its lower end and screw-threaded around the inside thereof, so that it may be screwed onto nipple 26. There is sufficient space between this latter and housing 31 surrounding it to prevent closure of ports 27 and 28 when the two complementary parts of the meter-coupling are so engaged. This housing has two nipples 32 and 33 arranged to meet the position of nipples 13 and 14 of the meter-housing, to which they connect by conduits 34 and 35, consisting of elbows and pipe-joints or integral castings arranged in any suitable manner. These nipples are furthermore spaced apart, so as to permit division of the interior of the housing by a partition in a manner which prevents direct communication between the open ends of ports 27 and 28 and also between nipples 32 and 33, but permits such from port 27 to nipple 32 and from nipple 33 to port 28, so that, as will now be seen, the meter is placed in the circuit of the pipe system, the course being from pipe 11 on one side out through port 27 into housing 31, out through nipple 32 and conduit 34 to and through the meter, out of this latter and through conduit 35 and nipple 33 back into housing 31, and from this latter through port 28 back into the general pipe-conduit 11, where it passes on. In the construction of this division of housing 31 provision must be made for the possibility of ready separation at the dividing-partition when the complementary parts of the coupling are separated, as well as for reconnection thereat, and which must be such as to form a waterproof slip-joint, it being understood that during the manipulations for such purposes none of the parts are directly accessible, since all is done from above. A practical way of forming this partition consists of an annular shoulder 36, permitting free entrance of the upper end of nipple 26, the waterproof closure being attained by a packing-ring or gasket 37, held against this shoulder and fitting tightly all around nipple 26. Near the lower end of housing 31 packing also becomes necessary simply to prevent leakage to the outside. This is done by a similar gasket 38. It is desirable when the meter is taken out that this packing comes up with it, thus permitting also its convenient replacing, if such be necessary. For such purpose the two gaskets are each held between two shoulders, which are so arranged as to form parts of housing 31, so that when this latter is moved these shoulders, with the packing held between them, come necessarily up with it. As to gasket 37, shoulder 36 mentioned confines it on the outer side and a shoulder 39 on the inner one. Gasket 38 is confined between shoulders 41 and 43. The inner shoulders 39 and 41 form, preferably, parts of a cage connected by ribs 44, so as to form a connected structure without obstructing passage of the water. The outer shoulder 43 is in form of a nut and fitted into the lower end of housing 31. This part of the meter-coupling may now be conveniently packed by simply placing gasket 37 against shoulder 36, setting the cage against this gasket, placing the other gasket against the lower end of the cage, and following it up with nut 43, which secures the two gaskets and holds all parts in position.

Meter-box 19 may also be used to contain the usual stop-cock 45, so that one manhole gives access to all parts.

It will now be seen that if detachment of the meter becomes necessary it may be quickly had by simply unscrewing it from nipple 26, the water having of course been turned off first at 45. If repairs are necessary, the meter may be taken to a shop, and they may be performed in all convenience. If the repairs are extensive and require considerable time or if the use of a meter is to be discontinued, a cap may be placed on nipple 26, as shown in dotted lines in Fig. 7, after which the water may be turned on again.

If used on the outside of a building, the meter may be placed sufficiently deep to be secure against frost and yet may be conveniently disconnected at any time from above by taking hold of the indicator-box 15 or by using an implement 46, as shown in Fig. 9, which shows the meter disconnected. It may be reattached in a similar manner, the slip-joint provided by gaskets 37 and 38 forming at all times a tight joint.

Member 25, having nipple 26 and closed by the cap, (shown in Fig. 7,) may also be placed in the pipe system of new lines where no meters are used as yet, but anticipated.

The connection at the ends of member 25 for insertion within the pipe-line may be by means otherwise than the union-couplings shown. It may, for instance, be by soldered or so-called "wiped" joints.

The lower end of nipple 26 is preferably broadened out, as shown, to form a firm base for the member 25 to rest upon.

It will also be readily seen that any meter of customary standard make may be attached by means of my improved coupling, it being merely necessary to fit the length and size of the conduit-pieces 34 and 35 to meet the nipples 13 and 14 of the meter-housing, so that no change in this latter nor special construction of it is required and the same is inserted between the ends of these conduit members 34 and 35, the same as it would be inserted into the pipe-line if directly connected.

Having described my invention, I claim as new—

In means for attaching a meter-housing detachably to a pipe-line, the combination of an intermediate section forming a part of this latter, an upwardly-extending nipple on this intermediate section, a partition dividing this latter vertically in a manner to form two open ports in this nipple, a housing open at its lower end adapted to be placed over this nipple and detachably connected to it by means of a screw connection, a horizontal division in this housing preventing direct communication between the open ports of the nipple while within this housing, open nipples on this latter one on each side of the horizontal partition therein and means to connect these nipples with the nipples of a meter-housing.

In testimony whereof I hereunto set my signature in the presence of two witnesses.

FRANK SHERIDAN.

Witnesses:
C. SPENGEL,
ALBERT A. MOEBUS.